Sept. 28, 1937.  W. G. AMBRIDGE  2,094,200
ANIMAL IDENTIFICATION TAG
Filed May 5, 1937
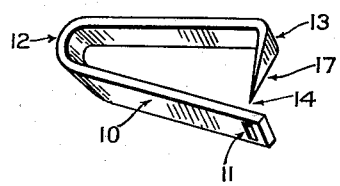
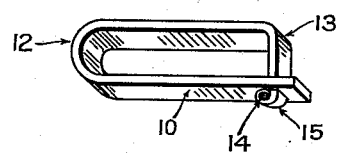
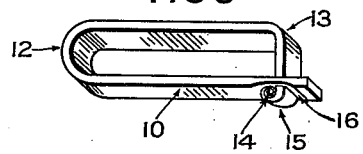
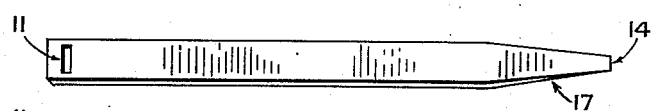
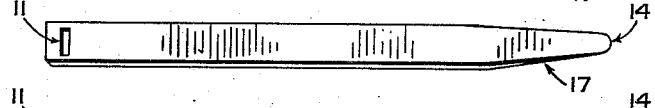
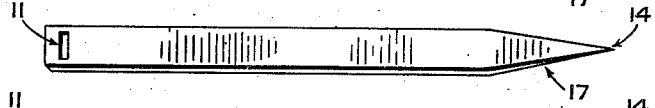
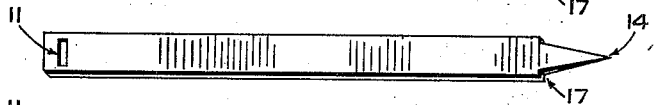
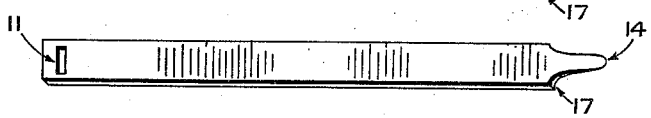
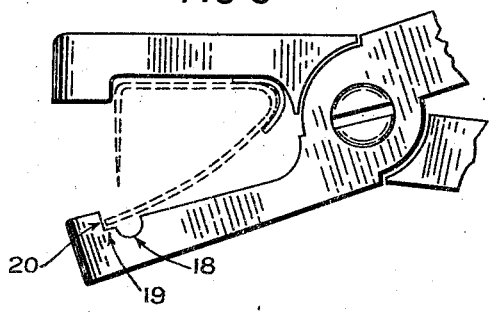
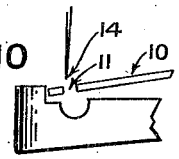
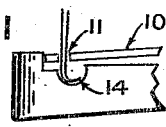
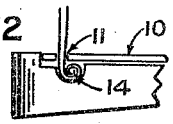
Inventor.
W. G. Ambridge Patented Sept. 28, 1937

2,094,200

UNITED STATES PATENT OFFICE 2,094,200

ANIMAL IDENTIFICATION TAG

William George Ambridge, Ottawa, Ontario, Canada

Application May 5, 1937, Serial No. 140,902
In Canada May 5, 1936

1 Claim. (Cl. 40—3)

This invention relates to new and useful improvements in an animal identification tag, the primary object of which is to provide a means of tagging an animal for identification purposes.

A further object is to provide a means whereby the tag when placed in an animal's ear cannot be tampered with without detection by an examining official.

A further object is to provide a locking means, capable of inexpensive manufacture and adaption to applying tools.

A further object is to provide a tag that is simple in design, easy to apply and rigid in construction.

A still further object is to provide a locking device which is destructible and practically irreplaceable if fraudulent removal and substitution is attempted.

In recent years metallic bands have been extensively used for identifying cattle, sheep, swine and other animals. These tags are used in millions by the Governments of the United States and Canada for the purpose of identifying cattle tested under various control policies for the eradication of contagious diseases. In every case the tag comprises a metallic band formed in a U-shape with a piercing point at one end and an aperture or eyelet at the other, through which this point passes and is clinched or locked in position. Usually the ear tags are applied by pliers of special design by which the user may at one operation pierce the ear and cause the point to lock the tag in position.

I am fully aware that the idea of applying a metal band as above described is not new, so my invention is chiefly confined to overcoming a common point of weakness, namely, possible unauthorized removal and fraudulent replacement in the ear of a substituted animal.

In overcoming this fault and attaining the object of my invention, I provide the usual flat band of metal with a tongue or piercing point at one end and an aperture at the other through which the tip of the tongue may be passed and locked or clinched, in such a manner and form that its removal and replacement without destruction or evidence of tampering is practically impossible.

By means of a die machined in one arm of the applying tongs the piercing point or tongue, after it passes through the ear and aperture, is formed into a spiral curl which serves the double purpose of a rigid lock and a destructible seal that is tamper proof and practically impossible to replace.

This is the novel feature of my invention and for which the protection of Letters Patent is desired.

The descriptions, claim and drawing hereto attached will clearly explain the details.

Figure 1 is a perspective view of my invention when not assembled.

Figure 2 is a perspective view of Figure 1 when assembled.

Figure 3 is a perspective view of a modified form of my invention showing the locking means when formed.

Figures 4, 5, 6, 7 and 8 show different forms of my piercing and locking means.

Figure 9 illustrates my tag as adapted to be held in an applying tool.

Figures 10, 11 and 12 show in detail the method of forming my spiral curl lock.

Referring more in detail it will be seen that my invention consists of a single unit identification tagging means 10, having an opening 11, located near one end. The member 10 is bent at 12, forming two parallel sides having the upper portion bent at a right angle as at 13, and having shoulders 17 shaped to permit the piercing point 14 to pass a predetermined distance through the aperture 11. When the tag is compressed in the applying tool the point 14 pierces the ear, then passes through the aperture 11, then strikes the bottom of the die 18 causing the tapered tip to deflect and curl to conform to the curvature of the die, and by continued pressure this tapered point takes the form of a solid spiral curl. This spiral curl 14 serves the double purpose of rigidly locking the tag in position and at the same time forming a tamper proof sealing means. It is the essential feature of my invention and its formation is facilitated by tapering the piercing point 14 to a degree or length approximating the circumference of the forming die. The die 18 is formed in an approximate half-circle and is slightly depressed to form a short flat wall at the top of the inner arc. The construction of this die is such that the resulting spiral curl given to the piercing point is of such a shape and rigid formation that its removal or replacement without special tools is practically impossible, and likewise renders evidence of any tampering visible. Figure 9 shows the action and position of my tag when brought into striking position. The lower arm of the tag 10 slides over the flat guiding surface 19 to the stop 20 causing the aperture 11 to register with the piercing point 14 and the forming die. The tag may be held in the applying tool by means of its own spring tension, or by retaining clips or springs. In the first method the aperture 11 is set over the die, and in the second arrangement the lower member 10 of the tag is caused to slide into striking position by the action of compressing the applying tool. The spiral curl lock may be formed to the right or left. The piercing end of my tag can be milled, ground, filed or stamp-pressed to better perform the requirements of my invention.

It is believed that the foregoing describes the purpose and application of my invention for which I desire protection.

I am aware that prior to my invention ear tags have been made with an aperture in the lower arm through which a piercing point passes and is bent either flat or curved to lock the tag in position. Such tags are not tamper proof and I therefore attain this object with a spiral curl lock, and I claim,—

An ear tag having a body portion of U-shape, with an aperture in one end and a piercing prong extending from the other end towards said aperture, said prong having flat sides and tapered in thickness uniformly from the piercing end for a sufficient length to enable the piercing end after passing through said aperture to be curled up in a tamper-proof solid spiral.

W. G. AMBRIDGE.